Nov. 14, 1950  E. A. FORD  2,529,928
TUBE FAILURE DETECTION CIRCUIT
Filed June 30, 1949
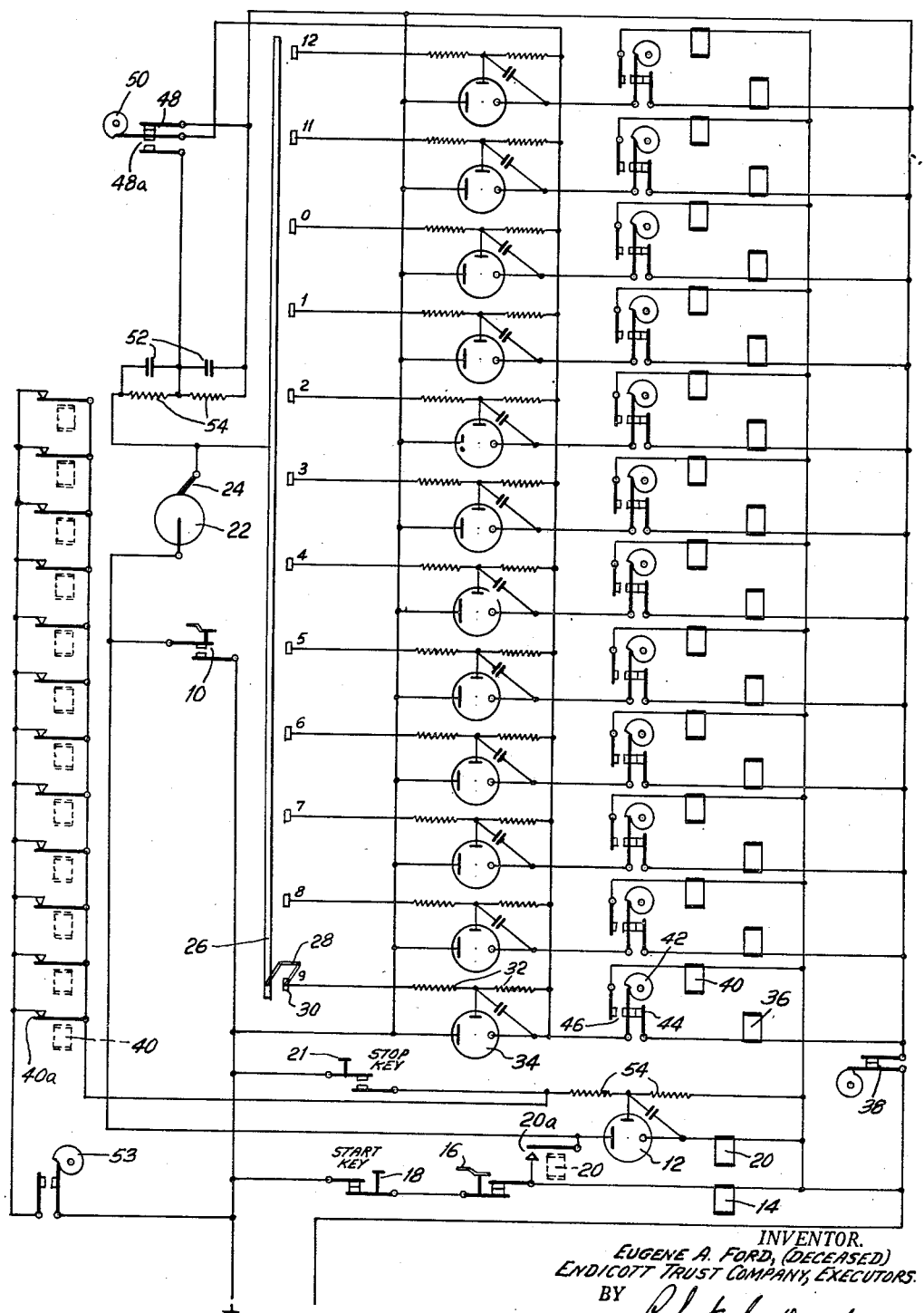
INVENTOR.
EUGENE A. FORD, (DECEASED)
ENDICOTT TRUST COMPANY, EXECUTORS.
BY
Robert S. Dunham
ATTORNEY Patented Nov. 14, 1950

2,529,928

UNITED STATES PATENT OFFICE 2,529,928

TUBE FAILURE DETECTION CIRCUIT

Eugene A. Ford, deceased, late of Endicott, N. Y., by Endicott Trust Co., executor, Endicott, N. Y., assignor to International Business Machines Corporation, New York, N. Y., a corporation of New York Application June 30, 1949, Serial No. 102,224

11 Claims. (Cl. 315—324)

This invention relates to a system for testing electron tubes in their normal work circuit.

The invention was conceived in connection with perforated record controlled accounting and computing machines using electron tubes in a relay capacity. It will, therefore, be convenient to explain the invention in connection with such machines, although its utility is by no means limited to devices of this specific class.

In electric computing and accounting machines of the well known perforated record controlled kind, a perforated control record such as a punched card is sensed by electrical means, and energized circuits are established to machine control magnets. Such magnets are energized when an electric impulse passes from a power source through a perforation in the record card and into the circuit in which the control magnet is located. Many such control circuits now include electron tubes, but tube failure in these circuits have heretofore caused faulty operation of the machines in question. This difficulty has been particularly marked in machines having in their control circuits a plurality of electron tubes.

It is, therefore, the principal object of this invention to provide a system for testing electron tubes in an electrical control circuit to detect whether such tubes have failed or whether their efficiency has been so impaired as to render their failure imminent.

It is a further object of the invention to provide means for periodically testing electron tubes in their normal work circuit without in any way interfering with the normal function of the work circuit.

It is a further object to provide a system for simultaneously testing a plurality of electron tubes in a work circuit.

It is still another object of the invention to provide a system for testing not only the tubes in a work circuit, but for testing also associated circuit components.

It is a further object of the invention to provide tube testing means which become operative after each normal work cycle of the system.

To the end that the objects of the invention may be achieved, there has been provided herein a tube testing system in connection with a work circuit which includes an electron tube or a plurality of electron tubes. Such work circuit also includes a current responsive control element in series with each electron tube or tubes together with means for periodically energizing the work circuit. The tube testing circuit is designed to include the electron tube or tubes of the work circuit, a test relay having normally closed contact points in connection with each tube or tubes, and means operative upon deenergization of the work circuit for energizing the testing circuit. A circuit completed through a fully operative tube or tubes will, therefore, energize the associated relay or relays and open the points thereof. The relays under the control of the electron tubes are disposed in a relay circuit which includes also a current responsive device which is in control of machine operation. This latter circuit also includes means for energizing the relay circuit after the test circuit has been energized so that the failure of a tube to energize its associated relay will cause the current responsive device in the relay circuit to operate. A warning is thus provided that a tube has failed or is about to fail.

The invention will be more particularly understood with reference to the single drawing which is a diagrammatic representation of a perforated record card sensing system having imposed thereon the tube testing circuit of the present invention.

In general, the invention contemplates a machine control circuit, a card sensing circuit, a tube testing circuit, and a relay circuit in the machine control circuit for controlling machine operation upon failure of one or more tubes.

The machine control circuit extends from the positive side of the line through a normally-closed card lever contact 10 to a current responsive device 12, which is herein illustrated as an electron tube in control of a machine clutch magnet 14. In its present environment, the control system is adapted to energize and deenergize the clutch control magnet 14, but it is to be understood that the current sensitive device 12 may be any suitable instrument, as for example, a signal device. The machine control circuit also includes a second set of card lever contacts 16, a start key 18, a relay 20 having normally open points 20a and a stop key 21.

The tube 12 is normally energized and the machine clutch is out of driving engagement when record cards are first placed into a card hopper in which the card lever 10 is located. Cards in such card hopper depress the card lever 10 and close the contacts thereof, thus establishing a circuit from the positive side of the line, through the closed points of the card lever 10, applying positive plate potential to the anode of the clutch control tube 12. Subsequent depression of the start key 18 opens its contacts, thereby deenergizing the clutch magnet 14, operating the main power clutch, which among other things, operates a conventional picker knife mechanism to feed cards one by one from the bottom of a stack in the card hopper for delivery into a feed throat where they contact the second card lever 16. When the second card lever 16 is depressed and the points thereof open, the start key 18 may be released and the machine will continue to operate until the card supply is exhausted, the stop key 22 is depressed, or the tube failure detection system comes into operation.

The system includes a perforated record card sensing circuit which extends from the positive side of the line through the closed card lever 10, through a card contact roller 22, through card sensing brushes 24, through a common commutator strip 26, through a bridging brush 28, through any one of a plurality of card sensing segments 30 in contact with the bridging brush 28, through a voltage divider 32 to the starter anode of an electron tube 34 in the active circuit. This results in the impression of 106 volts on the tube. The tube will now fire and its cathode-anode path will complete the pick-up circuit through closed magnet circuit switch points 44, to a machine control magnet 36. The circuit is completed to the negative side of the line through a main circuit breaker 38.

Herein there has been shown a plurality of electron tubes 34, which are arranged in parallel, thereby adapting them to a conventional electric perforated card sensing system. It will be understood that in perforated record controlled machines the control record has a plurality of index point positions disposed in a column. The sensing system disclosed herein is adapted for control by perforations in any one of twelve such index point positions. Therefore, there has been shown twelve sensing segments 30 in connection with the common strip segment 26, and each of these segments may be energized in turn in the presence of a card perforation in sensing position, as the bridging brush 28 is moved along the common segment 26 and into contact with succeeding sensing segments 30. When any one of the sensing segments is energized, its related tube and magnet circuit will also be energized, and the control magnet will perform its intended function. At the end of each sensing cycle the main circuit breaker 38 will open and extinguish any tubes that may have been fired during the preceding sensing cycle.

The interval between the sensing of one card and the sensing of a succeeding card provides time for energizing the tube testing circuit, and such testing circuit is energized substantially in the following manner. Each tube is provided with a testing relay 40 which is arranged in series with the control magnet 36, and is adapted to be placed in the tube circuit by means of a cam 42 which transfers the switch points under its control to close the test circuit through the test relay 40. Thus, while the normal position of the cam 42 during the operation of the card sensing circuit permits the contacts 44 to close and thereby establish a circuit through the tube 34 and the control magnet 36, rotation of the cam 42 in the interval between the normal card sensing operations will cause the switch to transfer and close a set of points 46 thereof. Closure of the testing circuit points 46 places the tubes in circuit with the test relays 40. It is, of course, to be understood that all of the switch cams 42 operate in unison and that their timing is such as to close the sensing circuit points 44 during normal card sensing operations and to transfer and close the testing circuit points 46 thereof during the tube testing part of the cycle.

When the points 46 have been closed, a test switch 48 transfers under the influence of a synchronously driven cam 50, thereby closing the points 48a thereof. Under these conditions, approximately 91 volts are provided by capacitors 52 and a voltage divider 54 for delivery to the anodes of all tubes in the circuit. The circuit is now from the positive side of the line, through the still closed contacts of the card lever 10, the sensing roller 22, the sensing brushes 24, the capacitors 52, the voltage divider 54, the closed points 48a of the test circuit switch 50, the tubes 34, the now closed test circuit points 46 and through the test relay 40 to the opposite side of the line.

A potential at a pulse current of 2.4 milliamperes, active for a short time, thereby supplies each tube with its rated starting condition of at least 90 volts at 200 microamperes. All tubes 34 should fire and energize their associated test relays under these circumstances, providing the tubes are in good condition. If a tube fails to fire, then the starter anode-cathode breakdown voltage has risen to a value that is too high and the tube should be replaced. Even though a tube does ignite, if the cathode condition is poor, thus limiting the flow of current through the tube, the associated test relay 40 will fail to become totally energized and will fail to transfer its points 40a. It should be noted that the test relays 40 draw a higher current than do the control magnets 36, therefore, if the cathode emission declines to an inoperative value a test relay will fail to operate prior to a control magnet.

If any of the test relays 40 fail to become energized, then its related contact 40a will remain closed so that when the relay circuit is energized the current responsive device 12 therein will come into operation. After the test circuit is energized by closure of the test switch 48a, a relay circuit maker 53 will close the points thereof and impress a current on the relay circuit in which the relay points 40a are disposed. This will complete a circuit from the positive side of the line through the closed test switch 52, a closed relay point 40a to a voltage divider 54 and the starter anode of the tube 12. The tube 12 will be fired and the relay 20 will be energized, thus closing the points 20a thereof and establishing a circuit to the machine clutch magnet 14. The machine clutch magnet circuit so established will be from the positive side of the line, through the still closed points of the card lever 10, the closed points 20a of the relay 20, to the clutch control magnet 14 and the opposite side of the line.

It will follow from the foregoing, therefore, that there has been provided herein a system for testing electron tubes in their normal work circuit, and furthermore, it will appear that a plurality of such tubes may be tested simultaneously during an interval between normal work circuit operations, so that the operation of a machine controlled by the work circuit is in no wise affected by the testing of the tubes. Furthermore, it will appear that the energization of the several circuits in point of time is such that they are sequentially brought into operation, thereby eliminating all need for manual attention.

Should a machine employing the system cease to operate by reason of failure of a tube during the testing cycle thereof, it will be necessary to inspect merely the relays 40 to detect which relay or relays has failed to open its points 40a. Since the relays 40 correspond in order to their respective tubes, the location of a tube that has failed or is about to fail will be readily apparent and a replacement may be made.

A machine employing the circuit may be manually disabled by depressing the stop key 22. Closure of the contact points of the stop key will establish a circuit from the positive side of the line and apply a potential of plus 100 volts through the voltage divider 26, to the starter anode of the clutch control tube 12, firing the same, and causing the relay 20 to become energized. Upon operation of the relay 20, its points 20a will close to complete a circuit from the positive side of the line, through the contacts of the card lever 10, and through the clutch magnet 14 to the opposite side of the line.

Having described the invention in its presently preferred embodiment, what is claimed is:

1. In an electrical control device having a work circuit including an electron tube, a current responsive control element in series with said tube, and means for periodically energizing said work circuit, a tube testing circuit including said electron tube, a relay having normally closed contact points in series with said tube in said testing circuit, means operative upon deenergization of said work circuit for energizing said testing circuit whereby a circuit completed through said tube will energize said relay and open the points thereof, a relay circuit including said relay and a current responsive device, and means operative upon energization of said testing circuit for energizing said relay circuit, thereby energizing said last named current responsive device upon failure of said tube to pass energizing current to said relay.

2. In an electrical control device having a work circuit including an electron tube, a current responsive control element in series with said tube, and means for periodically energizing said work circuit, a tube testing circuit including said electron tube, a relay having normally closed contact points in series with said tube in said testing circuit, a circuit maker and breaker operative upon deenergization of said work circuit for energizing said testing circuit whereby a circuit completed through said tube will energize said relay and open the points thereof, a relay circuit including said relay and a current responsive device, and a second circuit maker and breaker operative in timed relation with said first named circuit maker and breaker adapted to energize said relay circuit upon energization of said testing circuit, thereby energizing said last named current responsive device upon failure of said tube to pass energizing current to said relay.

3. In an electrical control device having a work circuit including an electron tube, an electromagnet in series with said tube, and means for periodically energizing said work circuit, a tube testing circuit including said electron tube, a relay having normally closed contact points in series with said tube in said testing circuit, means operative upon deenergization of said work circuit for energizing said testing circuit whereby a circuit completed through said tube will energize said relay and open the points thereof, a relay circuit including said relay and an electromagnetic device, and means operative upon energization of said testing circuit for energizing said relay circuit, thereby energizing said electromagnetic device upon failure of said tube to pass energizing current to said relay.

4. In an electrical control device having a work circuit including an electron tube, a current responsive control element in series with said tube, and means for periodically energizing said work circuit, a tube testing circuit including said electron tube, a relay having normally closed contact points in series with said tube in said testing circuit, a cam actuated switch operative upon deenergization of said work circuit for energizing said testing circuit whereby a circuit completed through said tube will energize said relay and open the points thereof, a relay circuit including said relay and a current responsive device, and a second cam actuated switch operative in timed relation to said first named cam actuated switch operative to energize said relay circuit upon energization of said testing circuit, thereby energizing said last named current responsive device upon failure of said tube to pass energizing current to said relay.

5. Testing means for electron tubes comprising a tube testing circuit including an electron tube to be tested, a relay having normally closed contact points in series with said tube in said testing circuit, means for energizing said testing circuit whereby a circuit completed through said tube will energize said relay and open the points thereof, a relay circuit including said relay and a current responsive device, and means operative upon energization of said testing circuit for energizing said relay circuit, thereby energizing said last named current responsive device upon failure of said tube to pass energizing current to said relay.

6. Testing means for electron tubes comprising a tube testing circuit including an electron tube to be tested, a relay having normally closed contact points in series with said tube in said testing circuit, means for energizing said testing circuit whereby a circuit completed through said tube will energize said relay and open the points thereof, a relay circuit including said relay and a machine clutch magnet, and means operative upon energization of said testing circuit for energizing said relay circuit, thereby energizing said machine clutch magnet upon failure of said tube to pass energizing current to said relay.

7. Testing means for electron tubes comprising a tube testing circuit including an electron tube to be tested, a relay having normally closed contact points in series with said tube in said testing circuit, a cam actuated switch for energizing said testing circuit whereby a circuit completed through said tube will energize said relay and open the points thereof, a relay circuit including said relay and a circuit responsive device, and a second cam actuated switch operative in timed relation to said first named cam actuating switch operative to energize said relay circuit upon energization of said testing circuit, thereby energizing said last named current responsive device upon failure of said tube to pass energizing current to said relay.

8. In an electrical control device having a work circuit including a plurality of electron tubes, a current responsive control element in series with each of said tubes, and means for sequentially energizing said tubes in said work circuit, a tube testing circuit for each of said electron tubes, a relay having normally closed contact points in series with a tube in each of said testing circuits, means operative upon deenergization of said work circuit for simultaneously energizing said testing circuits whereby a circuit completed through a tube will energize its associated relay and open the points thereof, a relay circuit including said relays and a current responsive device, and means operative upon energization of said testing circuits for energizing said relay circuit, thereby energizing said last named current responsive device upon failure of a tube to pass energizing current to its associated relay.

9. In an electrical control device having a work circuit including a plurality of electron tubes, an electromagnetic control element in series with each of said tubes, and means for sequentially energizing said tubes in said work circuit, a tube testing circuit for each of said electron tubes, a relay having normally closed contact points in series with a tube in each of said testing circuits, means operative upon deenergization of said work circuit for simultaneously energizing said testing circuits whereby a circuit completed through a tube will energize its associated relay and open the points thereof, a relay circuit including said relays and an electromagnetic device, and means operative upon energization of said testing circuits for energizing said relay circuit, thereby energizing said last named electromagnetic device upon failure of a tube to pass energizing current to its associated relay.

10. In an electrical control device having a work circuit including a plurality of electron tubes, a current responsive control element in series with each of said tubes, and means for sequentially energizing said tubes in said work circuit, a tube testing circuit for each of said electron tubes, a relay having normally closed contact points in series with a tube in each of said testing circuits, a cam controlled switch operative upon deenergization of said work circuit for simultaneously energizing said testing circuits whereby a circuit completed through a tube will energize its associated relay and open the points thereof, a relay circuit including said relays and a current responsive device, and a cam controlled switch operative in timed relation to said first named switch for energizing said relay circuit following energization of said testing circuits, thereby energizing said last named current responsive device upon failure of a tube to pass energizing current to its associated relay.

11. In an electrical control device having a work circuit including a plurality of electron tubes, a current responsive control element in series with each of said tubes, and means for sequentially energizing said work circuit, a tube testing circuit for each of said electron tubes, a relay having normally closed contact points in series with a tube in each of said testing circuits, a cam controlled switch operative upon deenergization of said work circuit for simultaneously energizing said testing circuits whereby a circuit completed through a tube will energize its associated relay and open the points thereof, a relay circuit including said relays and a machine clutch magnet, and a cam controlled switch operative in timed relation to said first named switch for energizing said relay circuit following energization of said testing circuits, thereby energizing said machine clutch magnet upon failure of said tube to pass energizing current to its associated relay.

ENDICOTT TRUST COMPANY,
By DAVID M. WARNER,
*Trust Officer,*
*Executor of Last Will and Testament of Eugene A. Ford, Deceased.*

No references cited.